United States Patent Office 2,695,300
Patented Nov. 23, 1954

2,695,300

PREPARATION OF A SERIES OF NEW 3-AMINO-2-OXAZOLIDONES

Gabriel Gever, Oxford, N. Y., assignor, by mesne assignments, to The Norwich Pharmacal Company, Norwich, N. Y., a corporation of New York No Drawing. Original application February 28, 1952, Serial No. 274,067, now Patent No. 2,652,402, dated September 15, 1953. Divided and this application July 29, 1953, Serial No. 371,180

1 Claim. (Cl. 260—307)

This invention relates to a new series of chemical compounds and the preparation thereof. The series consists of a number of closely related 3-amino-2-oxazolidones. They are described by the general formula:

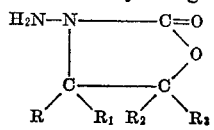

wherein

R is a member of the group consisting of hydrogen, lower alkyl and hydroxy (lower) alkyl
$R_1$ is a member of the group consisting of hydrogen, lower alkyl and hydroxy (lower) alkyl
$R_2$ is a member of the group consisting of hydrogen, lower alkyl and hydroxy (lower) alkyl, and
$R_3$ is a member of the group consisting of hydrogen, lower alkyl and hydroxy (lower) alkyl The new compounds of the series are particularly useful as intermediates for the preparation of members of a series of N-(5-nitro-2-furyl)alkylidene-3-amino-2-oxazolidones, notably, N-(5-nitro-2-furfurylidene)-3-amino-2-oxazolidone, which I have invented and which form the subject of my co-pending application, Serial No. 274,066, filed February 28, 1952. This application is a division of my co-pending application, Serial No. 274,067, filed February 28, 1952, now Patent No. 2,652,402.

The various members of the new series of 3-amino-2-oxazolidones which I have invented can be prepared by the treatment with acid solution of a 2-(2-hydroxyalkyl) semicarbazide hydrochloride. The hydroxyalkyl semicarbazide, for example, 2-(2-hydroxyethyl) semicarbazide, is added portion-wise to a refluxed solution of water and hydrochloric acid. Following the completion of the addition of the hydroxyalkyl semicarbazide, the mixture is further refluxed for approximately thirty minutes, at the end of which time the solution is cooled and the reaction is complete.

In order that my invention may be entirely available to those skilled in the art, the preparation by my method of a specific member of the series of new compounds is described briefly:

EXAMPLE

*3-amino-2-oxazolidone*

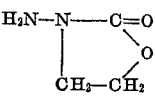

A mixture of 1500 cc. of water and 500 cc. of concentrated hydrochloric acid is heated to reflux and 100 g. of 2-(2-hydroxyethyl) semicarbazide hydrochloride added in small portions. The resulting solution is refluxed for 30 minutes and then cooled to room temperature.

What I claim is:

The method of preparing a 3-amino-2-oxazolidone represented by the formula:

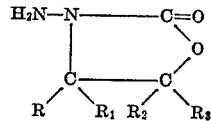

wherein

R represents a member of the group consisting of hydrogen, lower alkyl and hydroxy (lower) alkyl
$R_1$ represents a member of the group consisting of hydrogen, lower alkyl and hydroxy (lower) alkyl
$R_2$ represents a member of the group consisting of hydrogen, lower alkyl and hydroxy (lower) alkyl
$R_3$ represents a member of the group consisting of hydrogen, lower alkyl and hydroxy (lower) alkyl which comprises adding portion-wise a β-hydroxyalkyl-semicarbazide represented by the formula:

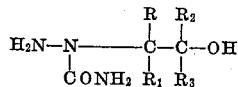

wherein R, $R_1$, $R_2$ and $R_3$ have the significance above given, to dilute hydrochloric acid and then refluxing the same for about 30 minutes.

No references cited.